US006829431B1

United States Patent
Haven et al.

(10) Patent No.: US 6,829,431 B1
(45) Date of Patent: Dec. 7, 2004

(54) DEVICE TO AUTOMATICALLY PREPARE INFANT FORMULA

(75) Inventors: Ken Haven, Fremont, CA (US); Jay Wilson, Portola Valley, CA (US); Dan Blaugrund, Palo Alto, CA (US); Vera S. Boudtchenko, Palo Alto, CA (US); Brandon Lee, Daly City, CA (US); Chang W. Lee, Fremont, CA (US)

(73) Assignee: Acorn Product Development, Inc., Fremont, CA (US)

( * ) Notice: Subject to any disclaimer, the term of this patent is extended or adjusted under 35 U.S.C. 154(b) by 117 days.

(21) Appl. No.: 10/324,875

(22) Filed: Dec. 19, 2002

(51) Int. Cl.[7] .................................................. F24H 1/18
(52) U.S. Cl. ..................... 392/441; 222/129.1
(58) Field of Search ........................ 392/442, 444–451; 222/129.1

(56) References Cited

U.S. PATENT DOCUMENTS

| 3,352,460 | A | * | 11/1967 | Herring .................... 222/129.4 |
| 3,819,086 | A | * | 6/1974 | Paolucci ....................... 221/11 |
| 4,566,507 | A | * | 1/1986 | Rauchwerger .............. 141/271 |
| 5,397,031 | A | * | 3/1995 | Jensen ..................... 222/146.5 |
| 5,797,313 | A | * | 8/1998 | Rothley ....................... 99/483 |
| 6,173,117 | B1 | * | 1/2001 | Clubb ......................... 392/442 |

* cited by examiner

Primary Examiner—Thor Campbell
(74) Attorney, Agent, or Firm—The Kline Law Firm

(57) ABSTRACT

A device to automatically dispense the proper amounts of dry baby formula and heated water to make liquid infant formula. The baby bottle is held in place in a pivoting transfer arm with a clip that fastens around the neck of the bottle. After the powdered formula is dispensed, the transfer arm swings the bottle to the water dispensing station. Water heated to the desired temperature is added to the bottle, and the formula is ready to be mixed and served.

18 Claims, 5 Drawing Sheets

DEVICE TO AUTOMATICALLY PREPARE INFANT FORMULA

BACKGROUND OF THE INVENTION

1. Field of the Invention

The present invention relates generally to devices for baby food preparation, and more particularly is a device to automatically prepare infant formula. The device comprises unique mechanisms for dispensing the powdered formula, for positioning the baby bottle, and for maintaining a chosen water temperature.

2. Description of the Prior Art

One of the key factors affecting a baby's health is diet. Therefore, many mothers breast feed their babies to ensure proper nutrition. However, many mothers feed their babies infant formula, either by choice or through an inability to adequately breast feed. Formula feeding provides nutritional value similar to mother's milk, but provides a large measure of convenience and allows fathers and other caregivers to directly assist in the feeding of the baby. Pediatricians advise that when formula is used, the formula should be fed to the baby with a uniform temperature throughout the content, and the temperature should be as close to that of the mother's milk as possible.

In addition to the nutritional value of the infant formula, the baby's caregiver is also interested in the expediency with which the formula can be dispensed (at the proper and consistent temperature) to feed the hungry and crying baby. The baby is also more inclined to return to sleep if he receives the formula in a timely manner. If allowed to become agitated, the baby may not return to sleep as readily.

One prior art method to prepare infant formula is the use of tap water supplied directly from a hot water heater. The tap water method has several disadvantages. Dispensing water at the proper temperature from the faucet can consume several minutes. First, the cold water must be purged from the water lines and replaced with warm water. Then, the temperature of the water must be adjusted to the proper level, which is generally at a lower than desired temperature. Further, the temperature of the water is not monitored.

Another prior art method of heating infant formula is the use of microwave ovens. While this method is often used because of convenience, it also has shortcomings because hot spots in the formula may develop, resulting in inconsistent formula temperature. Further, burns to the baby's body and digestive tract may result from drinking formula that is too hot.

The prior art is replete with devices that mix, heat, or store formula. See, e.g. "Apparatus and Method for Preparing Infant Formulae" by Roberson, U.S. Pat. No. 6,118,933, issued Sep. 12, 2000; the "Method for Preparing Infant Formula." also by Roberson, U.S. Pat. No. 6,253,028, issued Jun. 26, 2001; the "Milk Powder Dispenser" of Liao et al., U.S. Pat. No. 5,758,803, issued Jun. 2, 1998; the "Electronic Baby Formula Preparation and Storage Device" of Rothley, U.S. Pat. No. 5,797,313, issued Aug. 25, 1998; and the "Powdered Milk Measuring Container" of Chiang, U.S. Pat. No. 5,944,230, issued Aug. 31, 1999. All of these devices are directed to one or more aspects of the baby formula preparation process, and all can be helpful. However, a completely automated system for baby formula preparation is clearly desirable.

One fairly recent example of such an automated preparation device is the "Dry Baby Formula Maker" by LaBarbera, Jr., U.S. Pat. No. 5,570,816, issued Nov. 5, 1996. This device sterilizes the water used by boiling it. While desirable for bacteria control, the presence of boiling water in a formula preparation device presents significant injury possibility. Moreover, the LaBarbera device uses a common spout for the water and the formula. This arrangement typically leads to a caked residue of dry formula and water, which leads to plugging and malfunction of the device. Similarly, the "Heated Beverage Machine" of Clubb, U.S. Pat. No. 6,173,117, issued Jan. 9, 2001, describes a machine for mixing formula that also uses a common nozzle for the water and the formula, leading to the same problems as with the LaBarbera device.

Although many devices have been made to aid the caregiver in the preparation of formula for baby feeding, it is evident that the prior art has not yet disclosed an optimal automated solution. A need exists for an automated system of formula preparation that is easy to operate and maintain, and that avoids the problems present in the prior art.

Accordingly, it is an object of the present invention to provide an automated formula preparation apparatus that functions with a one-hand operation.

It is a further object of the present invention to provide a device that isolates the water dispensing and powder dispensing operations so that the problem of caked residue accumulation is avoided.

It is a still further object of the present invention to avoid having scalding hot water present in the system.

SUMMARY OF THE INVENTION

The present invention is a device to automatically dispense the proper amounts of dry baby formula and heated water to make liquid formula. The device has a formula dispensing station with a storage vessel for the powdered baby formula. The dispensing mechanism comprises a weight on a top side of the storage vessel and a blade at a dispensing port. The blade rotates relative to the storage vessel to dispense the proper amount of formula for a single serving into a baby bottle positioned in the dispensing station.

The baby bottle is held in place in a pivoting transfer arm with a clip that fastens around the neck of the bottle. After the powdered formula is dispensed, the transfer arm swings the bottle to the water dispensing station.

At the water station, water flows from a water receptacle into a heating section to heat the water to the desired temperature. When the water reaches the selected temperature, an indicator light is activated, signalling the user that the water is ready to be released into the bottle.

An advantage of the present invention is that all the operations are triggered by elements that can be operated with one hand, so that the user needs to have only one hand free to fill the baby bottle with formula.

Another advantage of the present invention is that the dispensing mechanism for the powdered formula is physically isolated from the dispensing station for the water so that residue from mixed formula is not a problem.

A still further advantage of the present invention is that the water is heated only as high as the selected dispensing temperature, so that scalding the baby or the user is not an issue.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
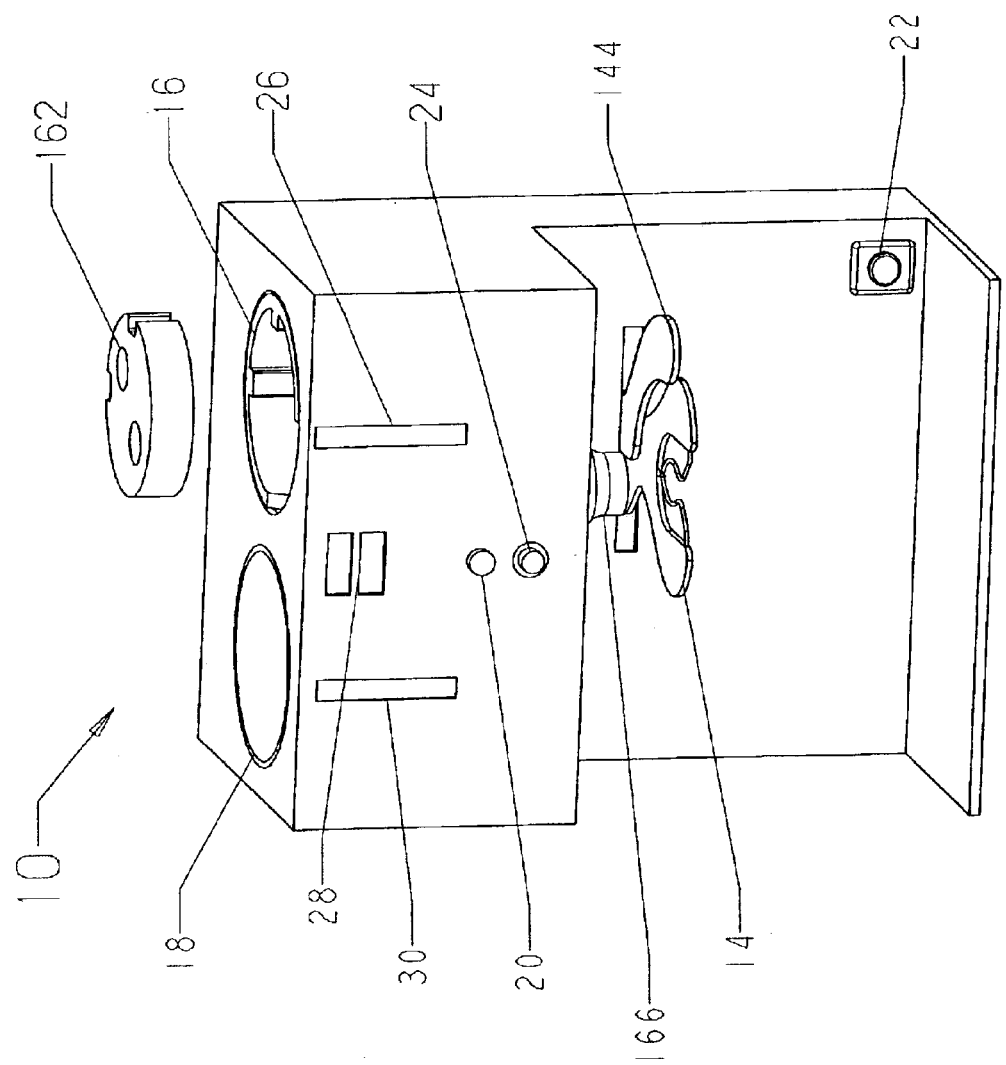
FIG. 1 is a perspective view of the automated infant formula preparation device of the present invention.

The present invention is device 10 to automatically prepare liquid baby formula by mixing powdered formula with heated water. The automatic preparation device 10 allows the user to accomplish the dispensing of both the formula and the water into a baby bottle 12 while using only one hand.

The baby bottle 12 is held in a pivoting transfer arm 14. The transfer arm 14 comprises a main body 141 with a forked bottle holder 142 at a distal end of the main body 141 to hold the bottle 12. The base end of the main body 141 is pivotally mounted in the preparation device 10. A securing means 143 secures the bottle 12 in the bottle holder 142. In the preferred embodiment, the securing means is a wireform clip, a flexible wire which deforms to accept the neck of the bottle 12 when the bottle 12 is inserted, and then rebounds to secure the bottle 12 in the bottle holder 142. Due to the flexibility of the securing means 143, the device can secure bottle necks of various sizes.

Figure 2:
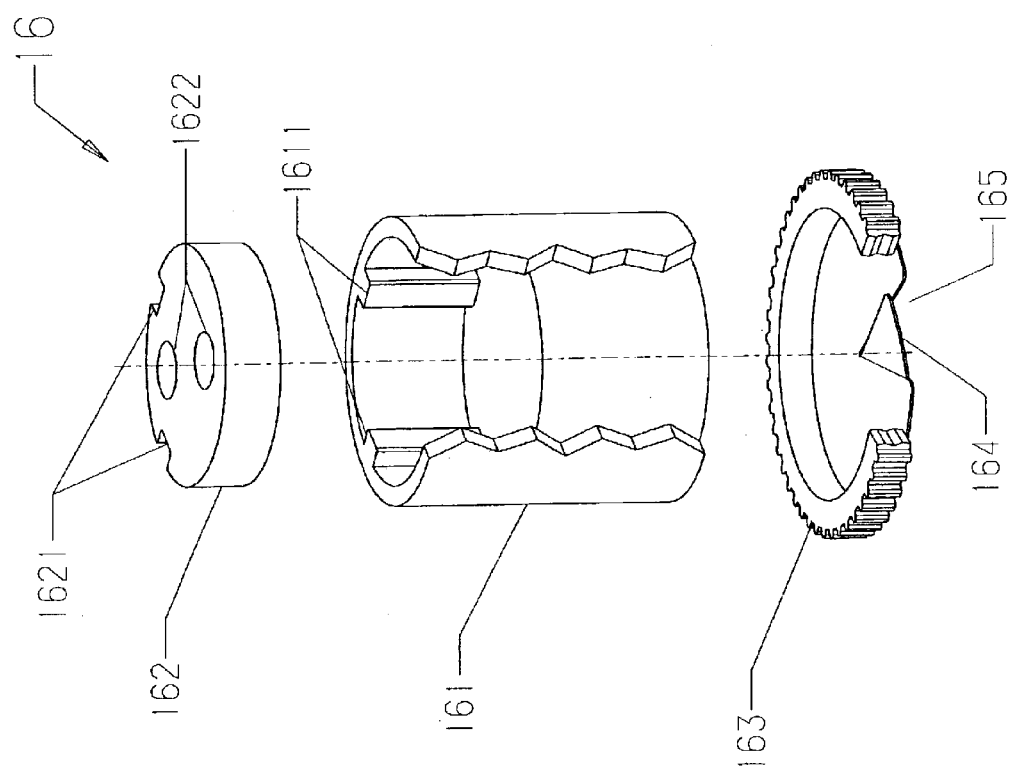
FIG. 2 is an exploded view of the powdered formula dispensing mechanism.
Figure 4:
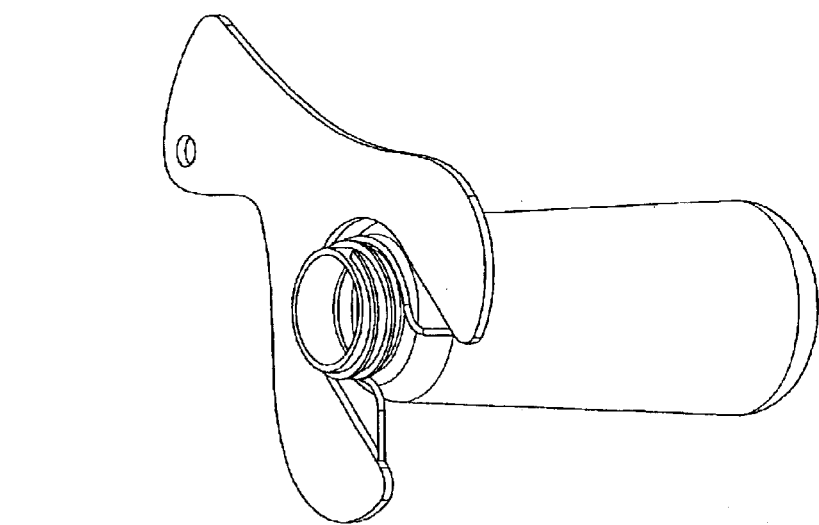
FIG. 4 shows the transfer arm with the baby bottle inserted in the transfer yoke.
Figure 3:
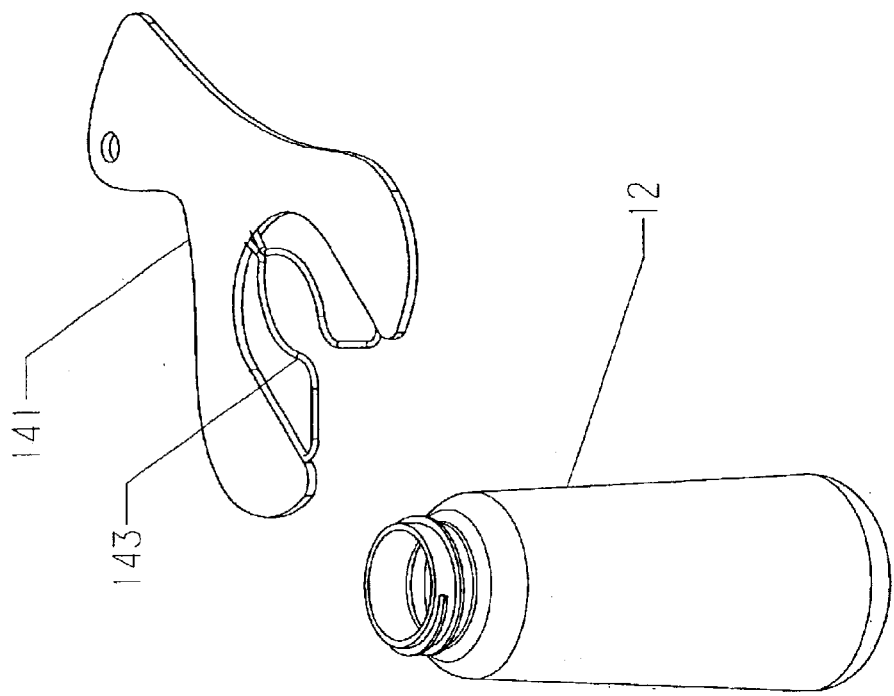
FIG. 3 shows the transfer arm in position to accept a baby bottle.
Figure 5:
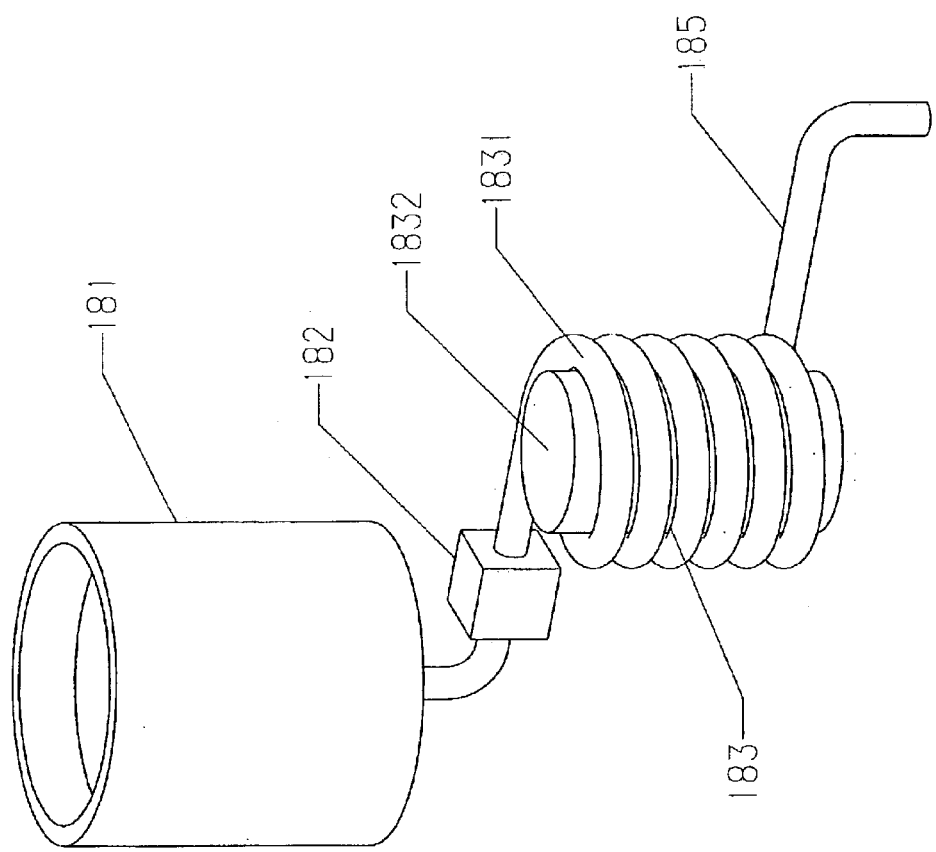
FIG. 5 illustrates the water heating and dispensing mechanism.
Figure 6:
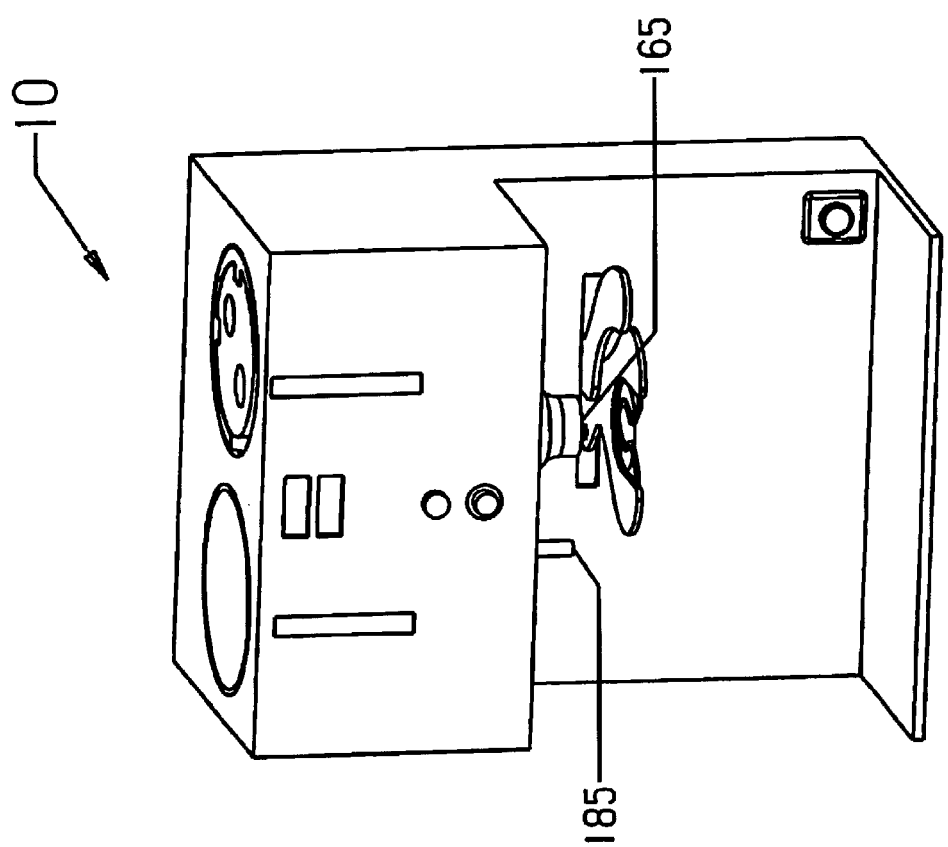
FIG. 6 shows the device with the water outlet physically separated from the formula outlet.

The proper amount of formula is dispensed into the baby bottle 12 by means of a formula dispensing mechanism 16. The formula dispensing mechanism 16, best seen in FIG. 2, comprises a storage vessel 161, a weight 162, and a lower end cap 163. The lower end cap 163 includes an upward angled blade 164 at the mouth of a dispensing port 165. The dispensing port 165 feeds the formula into a funnel 166.

The storage vessel 161 receives the powdered baby formula. A pair of protruding ridges 1611 that are received in corresponding slots 1621 in the weight 162 serve as an alignment means for the weight 162 relative to the storage vessel 161. The ridges 1611 extend the length of the inner wall of the storage vessel 161. A pair of gripping depressions 1622 in the top side of the weight 162 allow a user to more easily manipulate the weight 162.

A drive mechanism is included in the preparation device 10 to rotate the storage vessel 161 relative to the lower end cap 163. Any known drive mechanism can be utilized, and either the storage vessel 161 or the end cap 163 can be rotated. As the rotation occurs, the blade 164 "peels" off the desired amount of formula, so that the formula drops out of the dispensing port 165 and through the funnel 166.

Water to be mixed with the powdered formula is supplied by the water supply mechanism 18. The water supply mechanism 18 comprises a water receptacle 181. The flow of water from the receptacle 181 is controlled by a valve 182. When the valve 182 is opened to release water from the receptacle 181, the water flows through a water heater 183. After flowing through the water heater 183 and reaching the desired temperature, the heated water flows through a dispensing tube 185 into the baby bottle.

The water can be heated in the water heater 183 by any of several known methods. In the preferred embodiment, the water heater 183 comprises a contained flow path 1831 with a high surface area that keeps the water in close proximity to a heating element 1832. In the preferred embodiment, the contained flow path 1831 is a coil, and the heating element 1832 is cylindrical. The thermal mass of the heating element 1832 varies depending on the volume of water to be heated. For example, in a single serving machine, the heating element 1832 would have a relatively low thermal mass, and could be either a thin walled tube or a plate element. In a multi-serving machine, the heating element 1832 would be an element with high thermal mass.

The preparation device 10 includes a water ready indicator light 20 that is triggered when the water reaches a preset temperature. When the water from the receptacle 181 is properly heated, the water ready indicator light 20 is lit, and the user releases the water into the bottle 12. The device 10 further includes a view gauge 30 on the front panel to monitor the water level in the receptacle 181.

Operation of the automated baby formula preparation device 10 is as follows: Prior to preparation of the formula, the user fills the formula holding vessel 161 with powdered formula, and the water receptacle 181 with water. When the user is ready to prepare a bottle of liquid formula, he activates the formula preparation device 10 with a power switch 22.

The baby bottle is installed in the transfer arm 14, which is positioned so that the bottle is aligned with the funnel 166. The user depresses the powder dispense button 24 on the front face of the machine, and the formula dispensing mechanism 16 is activated. The storage vessel 161 is rotated relative to the lower end cap 163, so that with the weight 162 applying constant pressure on top of the powdered formula, the blade 164 peels off the desired amount of formula. The formula drops out of the dispensing port 165 and through the funnel 166 into the baby bottle. If multiple servings are desired, the user simply depresses the powder dispense button multiple times, or the machine is set to dispense multiple servings each time the powder dispense button is pushed. A powder level monitor slot 26 on the front of the device 10 allows the user to easily see how much powdered formula is left in the holding vessel 161.

The user then pushes the water fill lever 144, or simply the transfer arm 14 itself, to move the bottle so that the bottle is aligned with the water supply mechanism 18. When the water ready light 20 turns on, the user knows the water has reached the proper temperature. A temperature gauge 28 allows the user to further monitor the water temperature to ensure there are no burn accidents.

When the device 10 is activated, the user activates the first valve 182 to release the proper amount of water into the water heater 183. The water is heated to the desired temperature in the heater 183, and then flows through the dispensing tube 185 into the baby bottle.

When both the formula and the heated water have been dispensed into the baby bottle, the user replaces the cap, and shakes the bottle to thoroughly mix the formula. The formula is then ready to be served to the infant.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:

1. A device to prepare liquid infant formula comprising:

a powdered formula dispensing mechanism, a water supply mechanism, and a transfer arm to move a baby bottle between a formula dispensing position and a water dispensing position; wherein a user requires only one hand to activate said device and to prepare and to dispense a mixture of heated water from said water supply mechanism and powdered formula from said powdered formula dispensing mechanism in desired amounts into the baby bottle.

2. The device of claim 1 wherein:

said device dispenses a single serving of powdered formula each time said formula dispensing mechanism is actuated.

3. The device of claim 1 wherein:

said device dispenses more than one serving of powdered formula each time said formula dispensing mechanism is actuated.

4. The device of claim 1 wherein:

an outlet for the powdered formula and an outlet for the heated water are physically isolated from each other.

5. The device of claim 1 wherein:

said powdered formula dispensing mechanism comprises;

a reservoir to hold powdered formula, a means for applying pressure on the powdered formula to urge the powdered formula toward a dispensing port, a means for separating a desired portion of powdered formula from the powdered formula in said reservoir, an end plate, and a means for rotating said reservoir relative to said end plate; wherein when said reservoir rotates relative to said end plate, said means for separating removes the desired portion of powdered formula from the powdered formula in said reservoir such that the desired portion is dispensed through said dispensing port.

6. The device of claim 4 wherein:

said means for applying pressure on the powdered formula is a weight.

7. The device of claim 5 wherein:

said weight comprises at least one slot that aligns with at least one protrusion on said reservoir to keep said weight in a specific orientation.

8. The device of claim 4 wherein:

said means for separating the desired portion of powdered formula from the powdered formula in said reservoir is an angled blade affixed to said end plate.

9. The device of claim 1 wherein:

said transfer arm comprises a means for securing a baby bottle in a bottle holder of said transfer arm.

10. The device of claim 9 wherein:

said means for securing a baby bottle is a flexible clip which deforms to receive a neck of the baby bottle when the baby bottle is inserted into said transfer arm, said flexible clip rebounding toward an original position after receiving the neck of the baby bottle to secure the baby bottle in said bottle holder; wherein said flexible clip allows said means for securing the baby bottle to secure bottles of varying sizes.

11. The device of claim 1 wherein:

said water supply mechanism comprises:

a receptacle, at least one valve to control a flow of water through said water supply mechanism, a water heater, and a means for controlling a temperature of water in said water heater; wherein when the water in said water heater reaches a desired temperature, said water supply mechanism allows the heated water to be delivered through a dispensing tube into the baby bottle.

12. The device of claim 11 wherein:

said water heater comprises;

a heating element, and a contained flow path with high surface area; wherein said contained flow path is positioned so as to bring water from said receptacle into contact with said heating element such that the water is heated to a desired temperature.

13. A device to dispense powdered formula in a formula preparation device comprising:

a reservoir to hold powdered formula, a means for applying pressure on the powdered formula to urge the powdered formula toward a dispensing port, a means for separating a desired portion of powdered formula from the powdered formula in said reservoir, an end plate, and a means for rotating said reservoir relative to said end plate; wherein when said reservoir rotates relative to said end plate, said means for separating removes the desired portion of powdered formula from the powdered formula in said reservoir such that the desired portion is dispensed through said dispensing port.

14. The device of claim 13 wherein:

said means for applying pressure on the powdered formula is a weight.

15. The device of claim 14 wherein:

said weight comprises at least one slot that aligns with at least one protrusion on said reservoir to keep said weight in a specific orientation.

16. The device of claim 13 wherein:

said means for separating the desired portion of powdered formula from the powdered formula in said reservoir is an angled blade affixed to said end plate.

17. A device to move a baby bottle in a formula preparation device comprising:

a transfer arm pivotally affixed to a base, a bottle holder, and a means for securing a baby bottle in a bottle holder of said transfer arm; wherein said transfer arm moves the baby bottle from a first position at which powdered formula is dispensed into the baby bottle to a second position at which water is added to the powdered formula in the baby bottle.

18. The device of claim 17 wherein:

said means for securing the baby bottle is a flexible clip which deforms to accept a neck of the baby bottle when the baby bottle is inserted into said transfer arm, said flexible clip rebounding toward an original position after receiving the neck of the baby bottle to secure the baby bottle in said bottle holder; wherein said flexible clip allows said means for securing the baby bottle to secure bottles of varying sizes.

* * * * *